(12) United States Patent
Kaneko et al.

(10) Patent No.: US 12,018,964 B2
(45) Date of Patent: Jun. 25, 2024

(54) DETECTION SYSTEM

(71) Applicant: KYOSAN ELECTRIC MFG. CO., LTD., Kanagawa (JP)

(72) Inventors: Makoto Kaneko, Kanagawa (JP); Youichi Murakami, Kanagawa (JP); Katsunori Nakajima, Kanagawa (JP); Yuichiro Nakayama, Osaka (JP)

(73) Assignee: KYOSAN ELECTRIC MFG. CO., LTD., Kanagawa (JP)

( * ) Notice: Subject to any disclaimer, the term of this patent is extended or adjusted under 35 U.S.C. 154(b) by 935 days.

(21) Appl. No.: 17/042,149

(22) PCT Filed: Mar. 27, 2018

(86) PCT No.: PCT/JP2018/012255
§ 371 (c)(1),
(2) Date: Sep. 27, 2020

(87) PCT Pub. No.: WO2019/186671
PCT Pub. Date: Oct. 3, 2019

(65) Prior Publication Data
US 2021/0018338 A1 Jan. 21, 2021

(51) Int. Cl.
*G01D 5/22* (2006.01)
*G01P 13/02* (2006.01)
(Continued)

(52) U.S. Cl.
CPC ............... *G01D 5/22* (2013.01); *G01P 13/02* (2013.01); *G06T 7/248* (2017.01); *G08G 1/042* (2013.01);
(Continued)

(58) Field of Classification Search
CPC .................................. G01D 5/22; G01P 13/02
See application file for complete search history.

(56) References Cited

U.S. PATENT DOCUMENTS 3,911,389 A   10/1975  Mills
6,342,845 B1* 1/2002  Hilliard .................. G08G 1/042
                                                        340/941

(Continued)

FOREIGN PATENT DOCUMENTS

JP    H04-100200 A    4/1992
JP    H10-172093 A    6/1998
(Continued)

OTHER PUBLICATIONS

Mills Milton K: "Magnetic Gradient Vehicle Detector", IEEE Transactions On Vehicular Technology,, vol. VT-23, No. 3, Aug. 1, 1974 (Aug. 1, 1974), pp. 91-99, XP001348649.

(Continued)

*Primary Examiner* — Reena Aurora
(74) *Attorney, Agent, or Firm* — Hawaii Patent Services; Nathaniel K. Fedde; Kenton N Fedde

(57) ABSTRACT

Provided is a technique for detecting a vehicle type and a traveling direction of a vehicle by an electromagnetic induction sensor.
A sensor unit (10), which is an electromagnetic induction sensor, includes a transmission coil (TX1), a first reception coil (RX1), and a second reception coil (RX2). A magnetic field of a vehicle (90) made of steel attracts a magnetic field emitted from the transmission coil (TX1) (S1). As the vehicle (90) approaches, a state 1 indicated by the broken line changes to a state 2 indicated by the dash-dot line (S2). A reduction in induced voltage and a phase change occur with respect to the induced voltage when the first reception coil (RX1) is in the magnetic field of state 1 (when the vehicle is not detected) (S3). The differential output signals of the second reception coil RX2 and the first reception coil RX1 change according to the advancement of the vehicle and according to the unevenness of the vehicle bottom portion 92 and the metal species (S4). The trajectory image
(Continued)

representing a differential output signal in rectangular coordinates of a reception level and a phase difference is different for each vehicle, so the vehicle type may be distinguished.

4 Claims, 14 Drawing Sheets

(51) Int. Cl.
*G06T 7/246* (2017.01)
*G06V 20/52* (2022.01)
*G08G 1/042* (2006.01)
*G08G 1/056* (2006.01)

(52) U.S. Cl.
CPC .... *G08G 1/056* (2013.01); *G06T 2207/30241* (2013.01); *G06T 2207/30252* (2013.01); *G06V 20/52* (2022.01)

(56) References Cited

U.S. PATENT DOCUMENTS

| | | | |
|---|---|---|---|
| 7,734,500 B1* | 6/2010 | Allen | .................. G07B 15/063 701/1 |
| 2020/0130529 A1* | 4/2020 | Seong | ...................... G07C 5/08 |

FOREIGN PATENT DOCUMENTS

| | | |
|---|---|---|
| JP | 2009-286299 A | 12/2009 |
| JP | 2016-215662 A | 12/2016 |

OTHER PUBLICATIONS

European Patent Office. Extended European Search Report of foreign counterpart (EP 18912145.2/PCTJP2018012255). Dated Sep. 24, 2021.

* cited by examiner

DETECTION SYSTEM

TECHNICAL FIELD

The present invention relates to a detection system and a monitoring system; and for example, relates to a detection system for detecting a vehicle.

BACKGROUND ART

As methods of distinguishing a specific vehicle, a technique in which a vehicle is irradiated with laser light, the shape of the vehicle is distinguished from acquired distance information, and the specific vehicle is extracted; and a technique in which an image captured by a camera is binarized and the specific vehicle is extracted by processing the background difference or the like are known techniques. In such techniques, generally the vehicle type is distinguished from obtained vehicle shape information; and further, the vehicle traveling direction is distinguished based on the inter-frame difference. In a technique using light in this way, there is a technical problem when used in an outdoor environment in that the accuracy of distinguishing the vehicle type decreases due to fluctuation of the ambient light, paint color of the vehicle, reduced visibility due to fog, dispersion of light caused by rain, or the like.

To handle such a problem, a technique using magnetism has been proposed (see, for example, Patent Literature 1). In the technique disclosed in Patent Literature 1, two magnetic sensors for X-axis and Y-axis measurement are installed in the vehicle traveling axis direction and the vehicle opposing axis direction, and detect a unique magnetic field value held by the vehicle. The results of the X-axis output and the Y-axis output of the magnetic sensor are converted into R (level) and a phase value, and together with the vehicle traveling direction being determined based on whether the phase change is clockwise or counterclockwise, the R (level) size is used to determine the vehicle size and perform vehicle classification Moreover, a technique using electromagnetic induction is also known (for example, refer to Patent Literature 2). In the technique disclosed in Patent literature 2, a loop coil is installed, and by detecting the difference in the connection state with the vehicle bottom portion when the vehicle passes, the type of vehicle, for example, large trucks, 2-ton trucks, and passenger cars are determined.

CITATION LIST

Patent Literature

[Patent Literature 1] JP H10-172093A
[Patent Literature 2] JP H04-100200A

SUMMARY OF THE INVENTION

Technical Problem

Incidentally, in the technique of the magnetic sensor system of Patent Literature 1, there is a possibility that a specific vehicle may be detected from the difference in the magnetized state of the vehicle; however, the magnetic sensor system can not be practically used in an environment with electromagnetic noise such as along a railway, around a railroad crossing, or the like. Moreover, although this technique may be used in places where vehicles are passing at a relatively constant speed such as highways, there is a problem in that the output value of the magnetic sensor becomes large when multiple vehicles are stopped in a row due to traffic congestion, such as on a general road, and the output value of the magnetic sensor becomes small when the traffic in not congested. Moreover, this method detects a DC magnetic field, so there is a problem in that the output changes depending on the passing speed of a vehicle, and this imposes restrictions on practical use.

Moreover, in the technique of the loop coil method of Patent Literature 2, the method detects inductance change of the loop coil, so the detection resolution depends on the size of the loop coil. As is well known, the loop coil method requires a certain size or more, so the size is at a level that is capable of distinguishing the type of vehicle within an approximate size range, and in order to extract a specific vehicle (bus, maintenance vehicle, freight vehicle, or the like), it is necessary to install a radio, GPS receiver, ID tag, and/or the in the vehicle, and detect a specific vehicle by exchanging data with ground equipment.

The present invention has been made in view of the above circumstances, and it is an object of the present invention to provide a technique for solving the above-mentioned problems.

Solution to Problem

The detection system of the present invention includes: an electromagnetic induction sensor including a transmission coil and a first reception coil and a second reception coil that are differentially connected to each other; a trajectory image output unit that plots detection waveforms of the first reception coil and the second reception coil in a time series in a coordinate system represented by a reception level and a phase difference and outputs a trajectory image; and a vehicle detection unit that, based on the trajectory image, detects that a vehicle has passed through an area where the electromagnetic induction sensor is installed.

In addition, the detection system may further include: a registration unit that pre-registers a trajectory image of a vehicle to be detected as a reference image; and a determining unit that compares the reference image with the trajectory image outputted from the trajectory image output unit to determine whether a vehicle is a registered vehicle.

Moreover, the vehicle detection unit may determine a traveling direction of the vehicle based on a trajectory direction of the trajectory image.

The detection system of the present invention includes: an electromagnetic induction sensor including a transmission coil and a first reception coil and a second reception coil that are differentially connected to each other; and a determining unit that determines a vehicle by outputting detection waveforms of the first reception coil and the second reception coil in a time series to a coordinate system represented by a reception level and a phase difference and extracting characteristics of the output result.

Effect of the Invention

According to the present invention, when extracting a specific vehicle, an electromagnetic induction sensor installed on the ground detects the vehicle without mounting a wireless device, GPS, ID tag, or the like on the vehicle and exchanging data with the ground equipment to extract the specific vehicle, and based on the result of the detected waveform trajectory, the specific vehicle may be extracted and the traveling direction of the vehicle may be determined.

DESCRIPTION OF THE EMBODIMENTS

Next, a mode for carrying out the present invention (hereinafter, simply referred to as "embodiment") will be described in detail with reference to the drawings. The outline of this embodiment is as follows. In other words:
(1) Specific Vehicle Extraction Means An electromagnetic induction sensor is installed within the vehicle detection range. A trajectory image is acquired that represents a detection waveform in a rectangular coordinate system when the electromagnetic induction sensor detects a vehicle. The trajectory image of the acquired detection waveform is compared and collated with the trajectory image of the detection waveform (in other words "reference image") for each vehicle type registered in advance in data. The comparison and collation is determined by the degree of image matching. As a result, not only distinguishing the vehicle but also the distinguishing the vehicle type (extraction of a specific vehicle) is performed.
(2) Traveling Direction Determination Means for a Specific Vehicle The vehicle traveling direction is determined by determining the trajectory direction of the trajectory image when the electromagnetic induction sensor detects the vehicle. In the determination of the trajectory direction, a gradation or contrast difference is provided from the trajectory starting point to the trajectory end when creating an image of the trajectory. Image data having gradation or contrast difference is subjected to image processing to determine the trajectory direction from the trajectory start to the trajectory end.

<Basic Technique>

First, a basic technique for distinguishing a vehicle type using an electromagnetic induction sensor will be described. The electromagnetic induction sensor may be applied to a distance measurement application or a metal species determination application specialized for a metal material and that utilizes an eddy current effect generated in the metal material. Distinguishing a vehicle type is a mechanism in which the electromagnetic induction sensor acquires distance difference information due to a shape difference that occurs in each vehicle made of metal and information of a metal difference that is configured for each vehicle.

Figure 1:
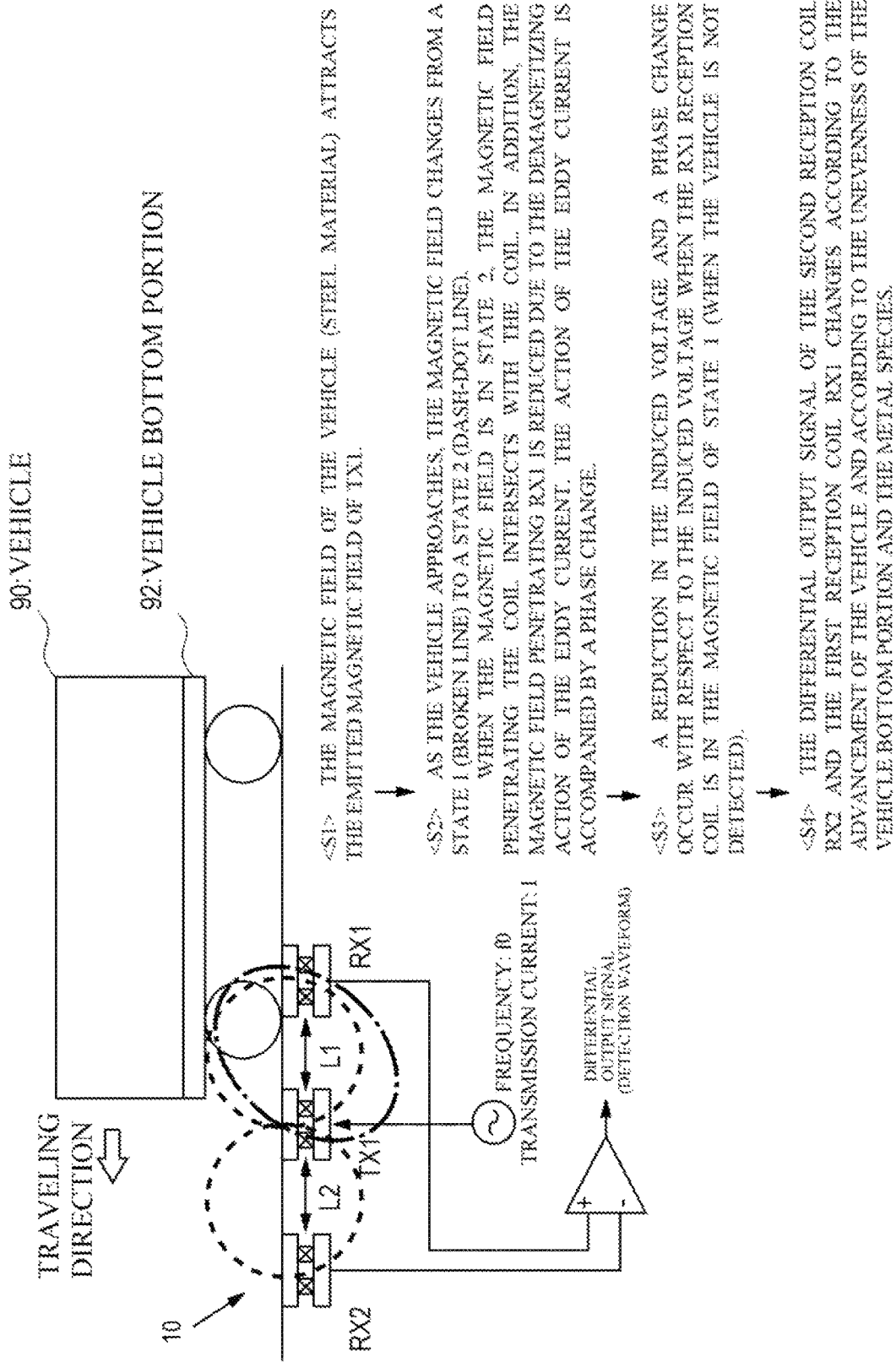
FIG. 1 is a diagram illustrating an example of detecting a vehicle bottom portion of a vehicle with an electromagnetic induction sensor according to an embodiment.

The optimum implementation method will be described below with reference to FIG. 1. FIG. 1 illustrates an example in which a vehicle bottom portion 92 of a vehicle 90 is detected by an electromagnetic induction sensor. The sensor unit 10 is an electromagnetic induction sensor and includes a transmission coil TX1, a first reception coil RX1, and a second reception coil RX2.

The inter-coil distance L1 between the transmission coil TX1 and the first reception coil RX1, and the inter-coil distance L2 between the transmission coil TX1 and the second reception coil RX2 are set to be equal distances. The sensor unit 10 is buried in the road with such a configuration. In this state, when a transmission current I having the frequency f0 is supplied to the transmission coil TX1, an alternating magnetic field is emitted from the transmission coil TX1. The voltages induced in the first reception coil RX1 and the second reception coil RX2 placed at equal distances have the same level, and the differential output value (differential output signal) outputted in FIG. 1 is almost 0 V. This state is a steady state in which no vehicle is detected (vehicle non-detection state).

When the vehicle 90 passes directly above the sensor unit 10 in the vehicle non-detection state, a detection waveform different for each vehicle 90 is outputted as a differential output signal by the mechanism illustrated in FIG. 1. More specifically, the emitted magnetic field of the transmission coil TX1 is attracted by the magnetic field of the vehicle 90 of steel material (S1).

As the vehicle 90 approaches, the state 1 indicated by the broken line in FIG. 1 changes to the state 2 indicated by the dash-dot line (S2). When the magnetic field is in state 2, the magnetic field penetrating the reception coil (here, the first reception coil RX1) intersects with the coil. In addition, the magnetic field penetrating the first reception coil RX1 is reduced due to the demagnetizing action of the eddy current. Moreover, the action of the eddy current is accompanied by a phase change.

A reduction in the induced voltage and a phase change occur with respect to the induced voltage when the first reception coil RX1 is in the magnetic field of state 1 (when the vehicle is not detected) (S3).

Continuing, the differential output signal of the second reception coil RX2 and the first reception coil RX1 changes according to the advancement of the vehicle and according to the unevenness of the vehicle bottom portion 92 and the metal species (S4). By obtaining different detection waveforms for each vehicle in this way, not only is it possible to distinguish the vehicle but it is also possible to distinguish the vehicle type.

Hereinafter, the merits of differentially connecting the first reception coil RX1 and the second reception coil RX2 will be described. In the present method there is a differential connection, so the change in the coil inductance due to a temperature change is the same in the first reception coil RX1 and the second reception coil RX2, and is canceled by the differential connection. Moreover, even in a case where the emitted magnetic field level changes due to the inductance change of the transmission coil TX1, there is a differential connection, so both the induced voltage of the first reception coil RX1 and the induced voltage of the second reception coil RX2 decrease, and there is no change in the differential output result. In other words, even in a case where the temperature of the external environment changes, the detection output in the steady state does not change and is a stable value. Therefore, by differentially connecting the first reception coil RX1 and the second reception coil RX2, only the uneven state of the vehicle bottom portion 92 can be detected with high sensitivity. Furthermore, even in an environment in which there is electromagnetic noise, such as along railway lines, around railroad crossings, and the like, the first reception coil RX1 and the second reception coil RX2 are differentially connected, and therefore, so-called common mode noise occurs and the output waveform is not affected. In other words, by adopting this method, operation is possible without changing the filter for avoiding the electromagnetic noise source and without changing the frequency f0.

Figure 2:
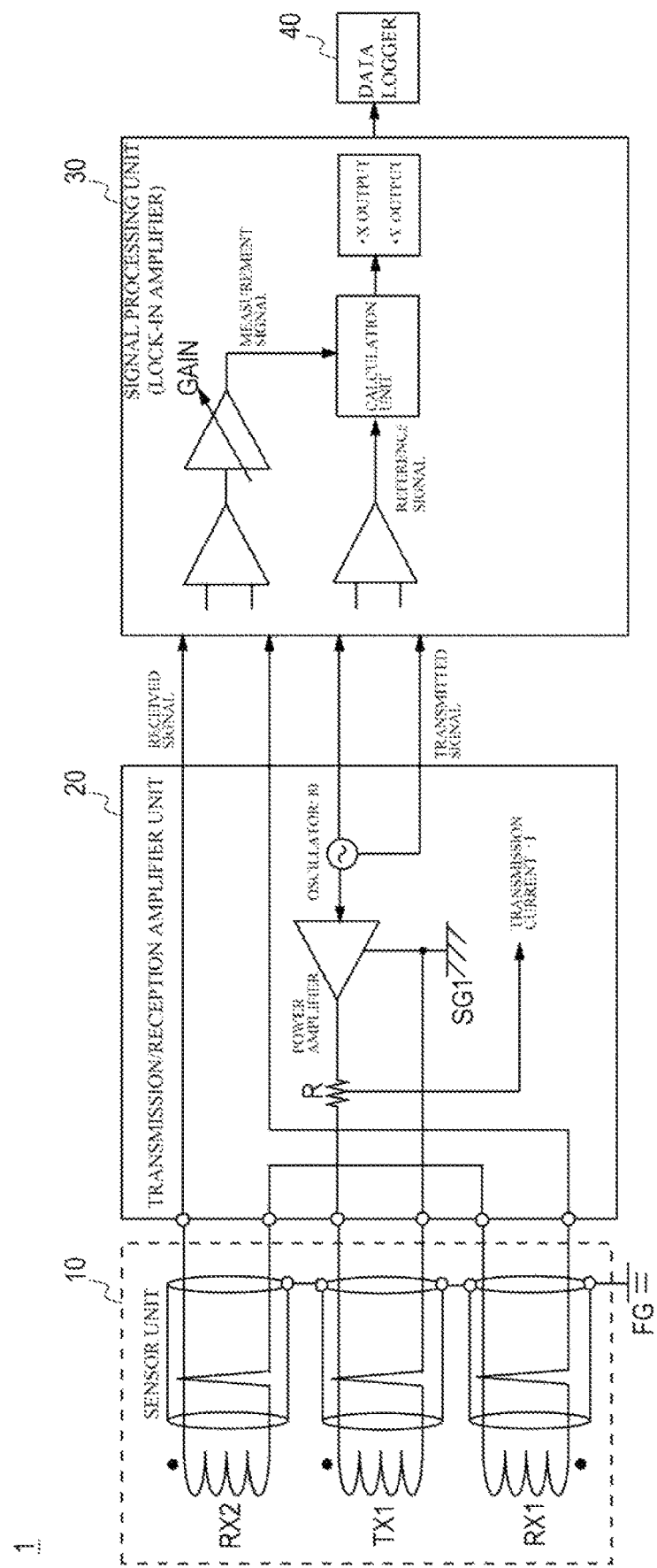
FIG. 2 is a diagram illustrating an example of configuration of a detection system used in a vehicle detection test according to an embodiment.

Hereinafter, the test results of a specific vehicle detection example (example of distinguishing vehicle type) will be described. FIG. 2 illustrates an example of configuration of the detection system 1 used in the test. The detection system 1 used here includes the sensor unit 10 described above, a transmission/reception amplifier unit 20, a signal processing unit 30, and a data logger 40. The signal processing unit 30 is a so-called lock-in amplifier.

In the transmission/reception amplifier unit 20, an alternating current having a frequency f0 is applied from the power amplifier to the transmission coil TX1 of the sensor unit 10. As a result, an alternating magnetic field is outputted. The transmitted signal having the frequency f0 and the differential output result of the first reception coil RX1 and the second reception coil RX2 are inputted to the signal processing unit 30 that is a lock-in amplifier. The signal processing unit 30 outputs the X-coordinate and the Y-coordinate in the polar coordinate system resulting from the arithmetic processing to the data logger 40. The data logger 40 collects the output result from the signal processing unit 30 every 5 ms.

Figure 3:
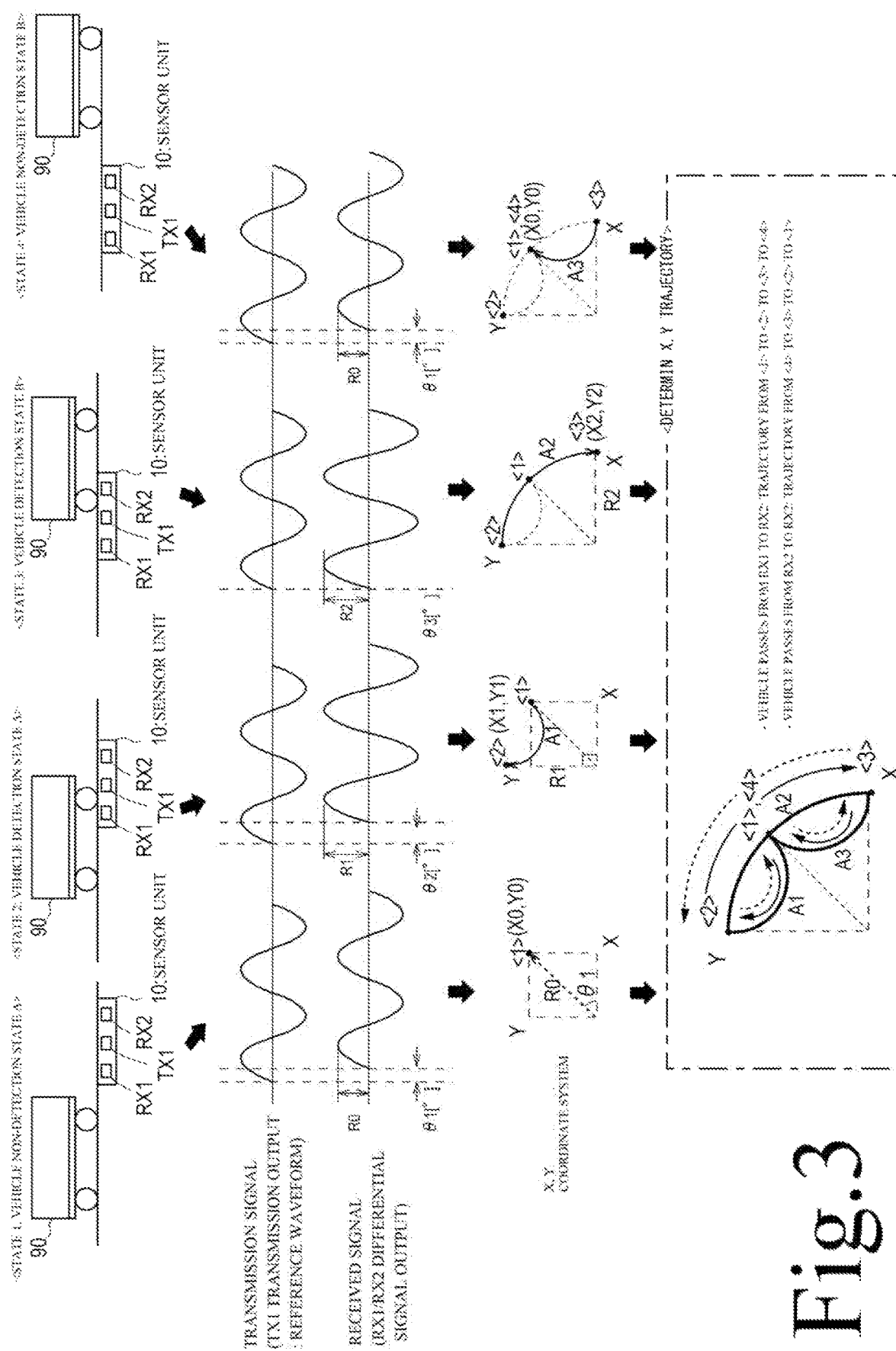
FIG. 3 is a diagram illustrating a trajectory of data obtained by a data logger in a case of passing a sensor unit (transmission coil, first reception coil, second reception coil) according to an embodiment.

Referring to FIG. 3, the trajectory of the data obtained by the data logger 40 will be described for a case where the vehicle is made to pass in a direction from the first reception coil RX1 to the second reception coil RX2, and for a case where the vehicle is made to pass in a direction from the second reception coil RX2 to the first reception coil RX1. In FIG. 3, the sensor unit 10 buried in the road has a first reception coil RX1 on the left side, a second reception coil RX2 on the right side, and a transmission coil TX1 in the center.

State 1 is a vehicle non-detection state A in which the vehicle 90 is on the left side of the sensor unit 10. State 2 is a vehicle detection state A in which the right wheels of the vehicle 90 are between the first reception coil RX1 and the transmission coil TX1.

State 3 is a vehicle detection state B in which the left wheels of the vehicle 90 are between the second reception coil RX2 and the transmission coil TX1. State 4 is a vehicle non-detection state B in which the vehicle 90 is on the right side of the sensor unit 10.

In state 1, the received signal is at the level R0 and is deviated by a phase θ1 with respect to the transmitted signal, and is plotted at the coordinates <1> (X0, Y0) in the X, Y coordinate system.

In state 2, the received signal is at the level R1 and is deviated by a phase θ2 with respect to the transmitted signal, and is plotted at the coordinates <2> (X1, Y1) in the X, Y coordinate system. As the vehicle 90 transitions from state 1 to state 2, the plotted points form an arc A1 from coordinates <1> to <2> as illustrated.

In state 3, the received signal is at the level R2 and is deviated from the transmitted signal by the phase θ3 (here, the phase difference is 0), and is plotted at the coordinates <3> (X1, Y1) in the X and Y coordinate system. As the vehicle 90 transitions from state 2 to state 3, the plotted points form an arc A2 from coordinates <2> to <3> as illustrated.

In state 4, the state returns to the same state as in state 1, the received signal is at the level R0, and is shifted by the phase θ1 with respect to the transmitted signal, and is plotted at the coordinates <4> (X0, Y0) in the X and Y coordinate system. As the vehicle 90 transitions from state 3 to state 4, the plotted points form an arc A3 from coordinates <3> to <4> as illustrated.

In a case where the vehicle 90 is made to pass in the direction from RX1 to RX2, and in a case where the vehicle 90 is made to pass in the direction from RX2 to RX1, the trajectories of the plots (arcs A, B, and C in the above example) are drawn in opposite directions. In other words, in a case where the vehicle 90 passes in a direction from the first reception coil RX1 to the second reception coil RX2, the trajectory is drawn in the order of the coordinates <1> to <2> to <3> to <4> (the order of arcs A1 to A2 to A3). Moreover, in a case where the vehicle 90 passes in a direction from the second reception coil RX2 to the first reception coil RX1, the trajectory is drawn in the order of the coordinates <4> to <3> to <2> to <1> (the order of arcs A3 to A2 to A1).

Next, FIG. 4 to FIG. 11 illustrate the data results for two vehicle types for a case in which the vehicle 90 is made to pass in a direction from RX1 to RX2, and for a case in which the vehicle 90 is made to pass in a direction from RX2 to RX1 in the configuration of the detection system 1.

Figure 4:
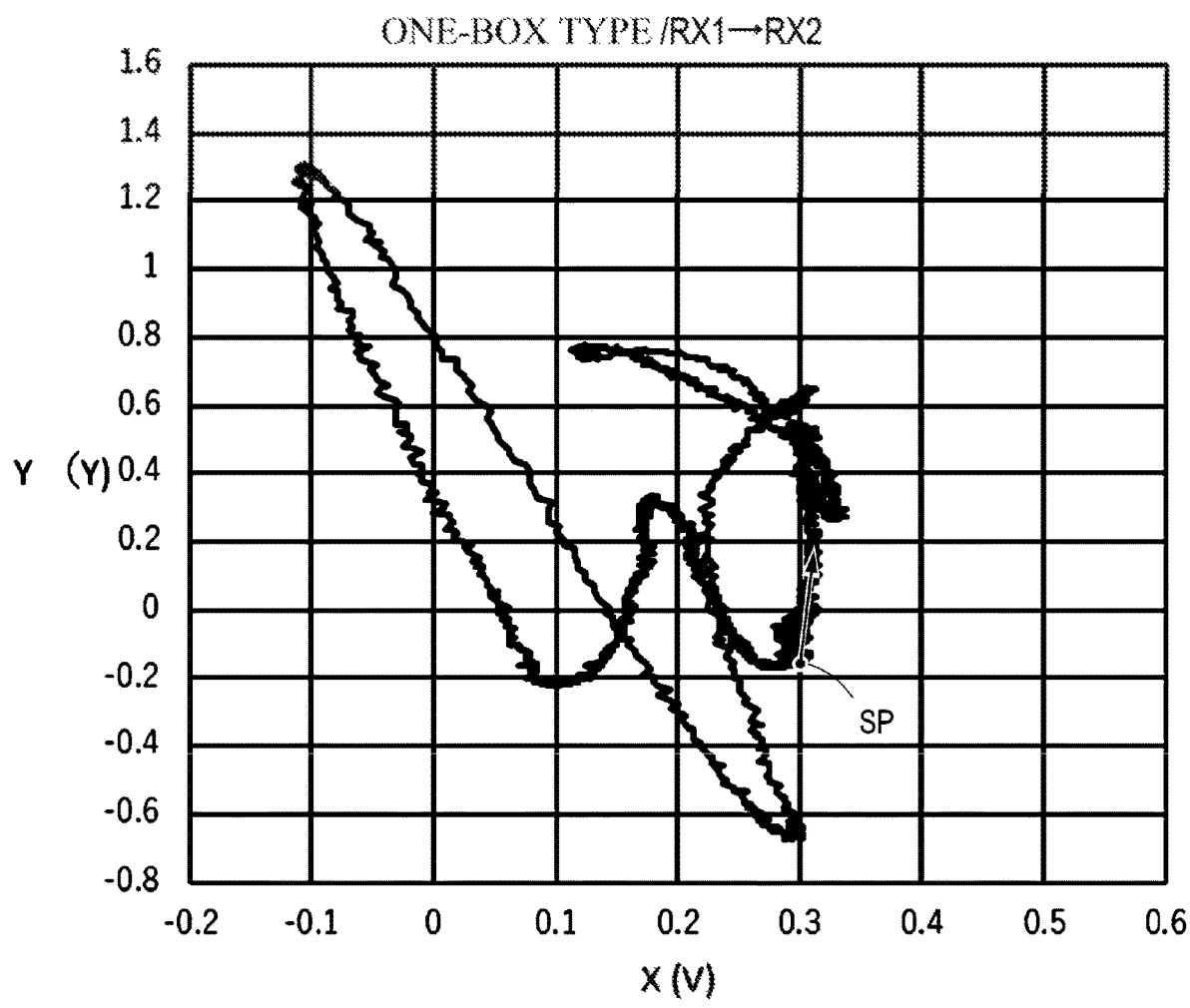
FIG. 4 is a diagram illustrating the X and Y trajectory of a one-box car according to an embodiment.
Figure 5:
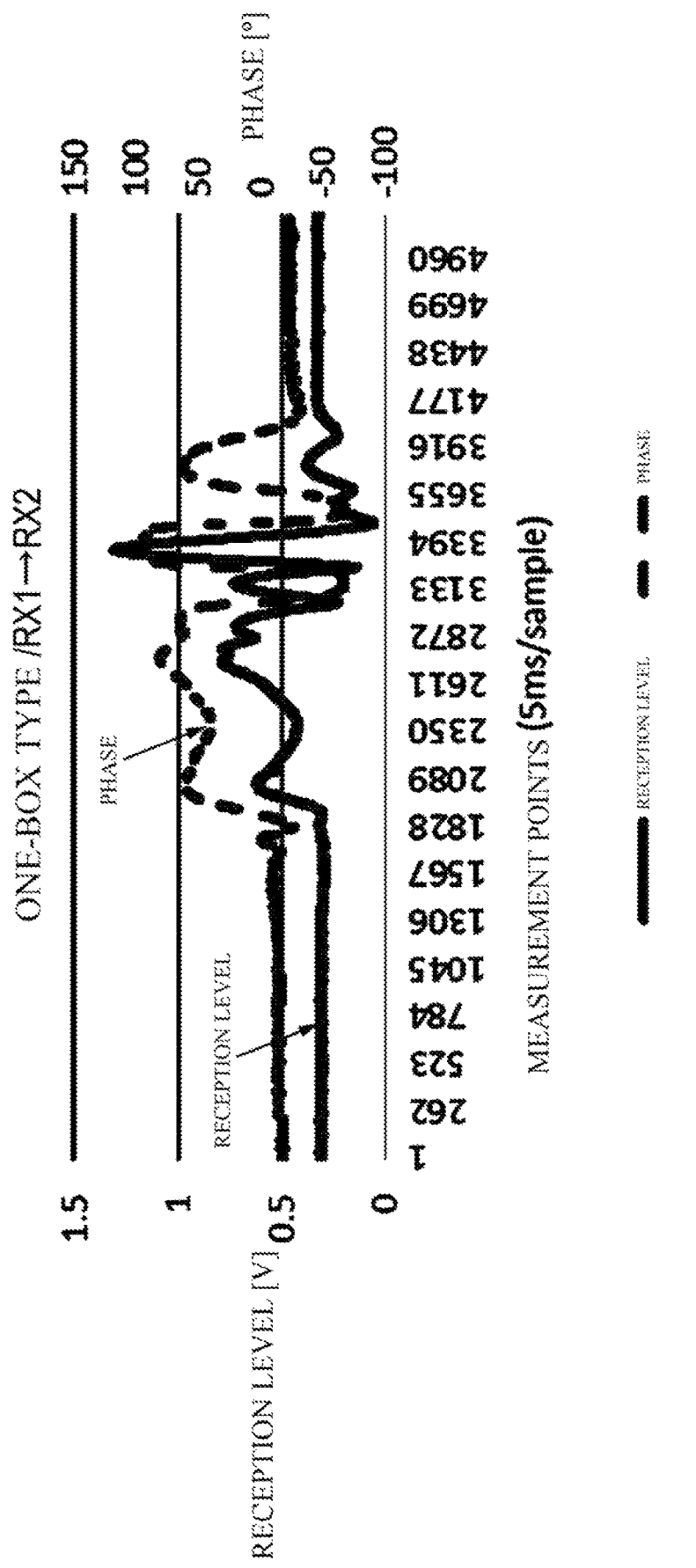
FIG. 5 is a diagram illustrating time-series data obtained by converting time-series X and Y data collected for a one-box car into a reception level and a phase value according to an embodiment.
Figure 6:
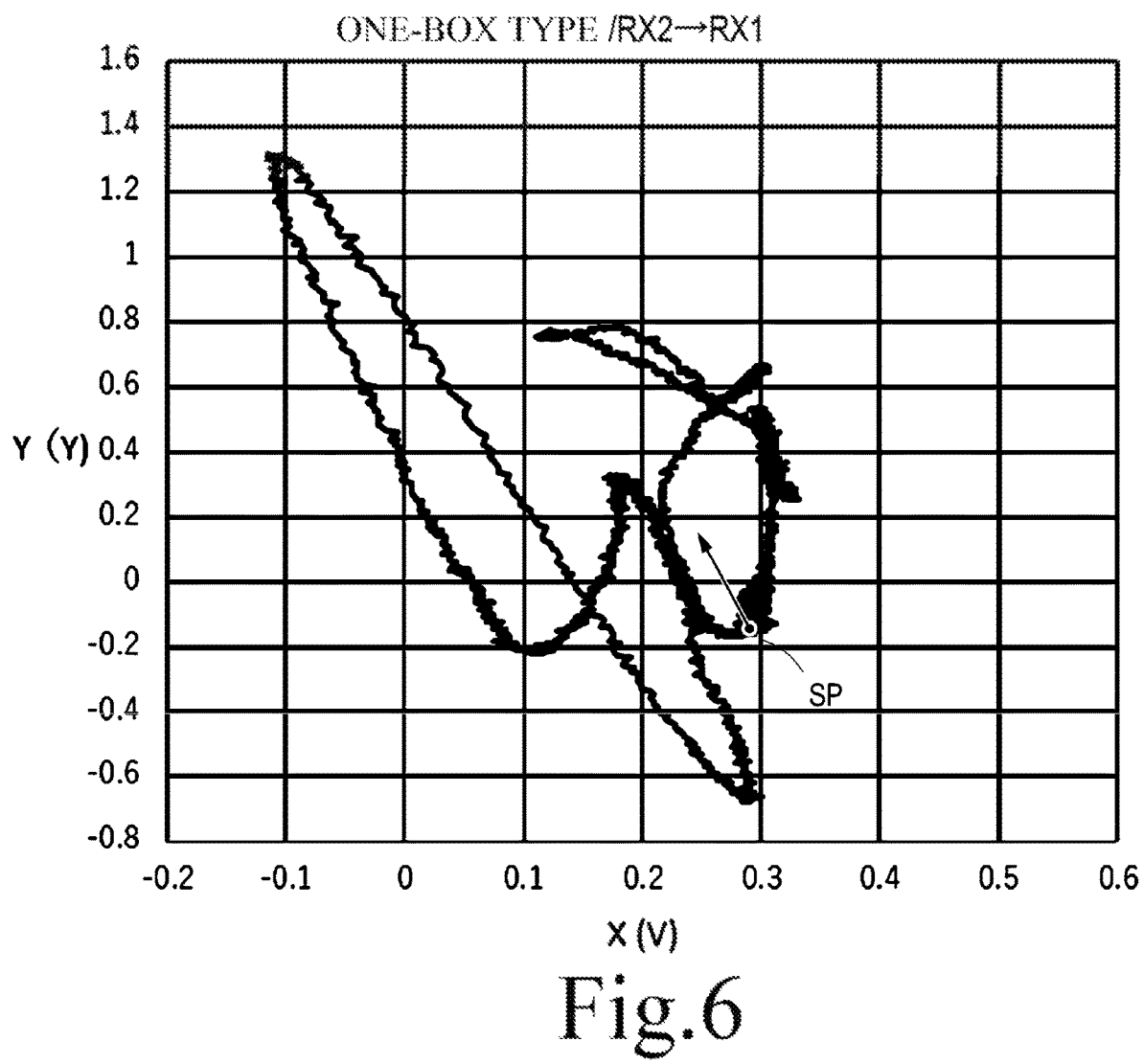
FIG. 6 is a diagram illustrating the X and Y trajectory of a one-box car according to an embodiment.
Figure 7:
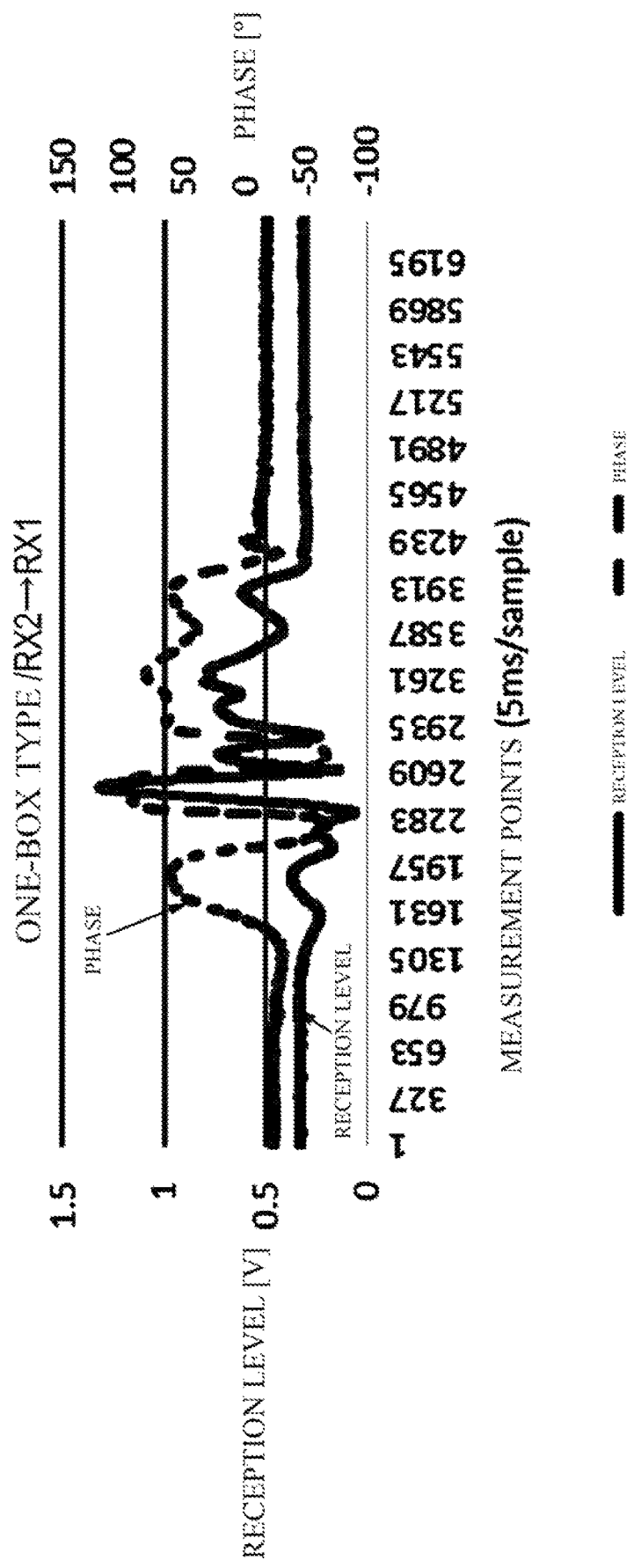
FIG. 7 is a diagram illustrating time-series data obtained by converting time-series X and Y data collected for a one-box car into a reception level and a phase value according to an embodiment.
Figure 8:
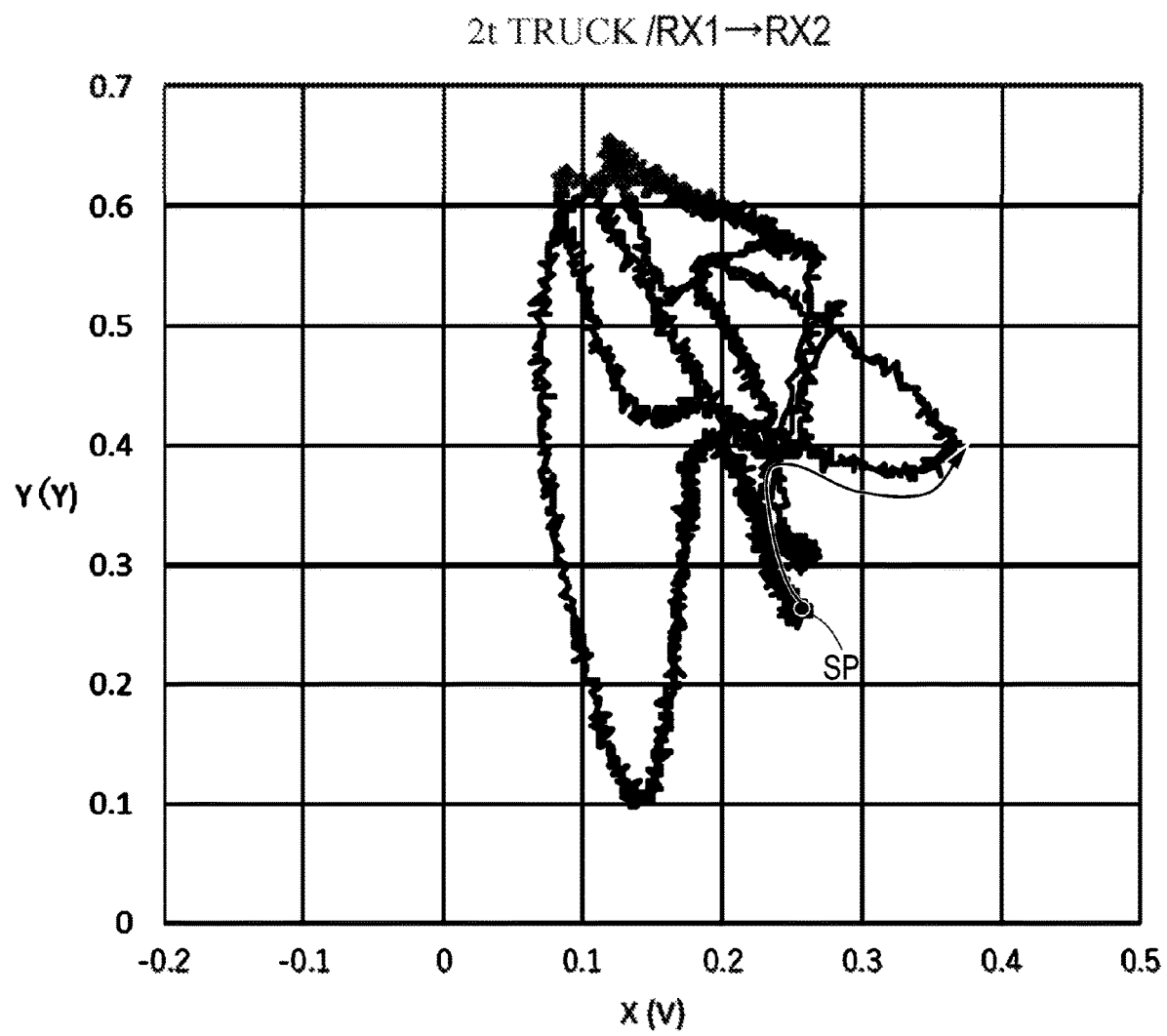
FIG. 8 is a diagram illustrating the X and Y trajectory of a 2 t truck vehicle according to an embodiment.
Figure 9:
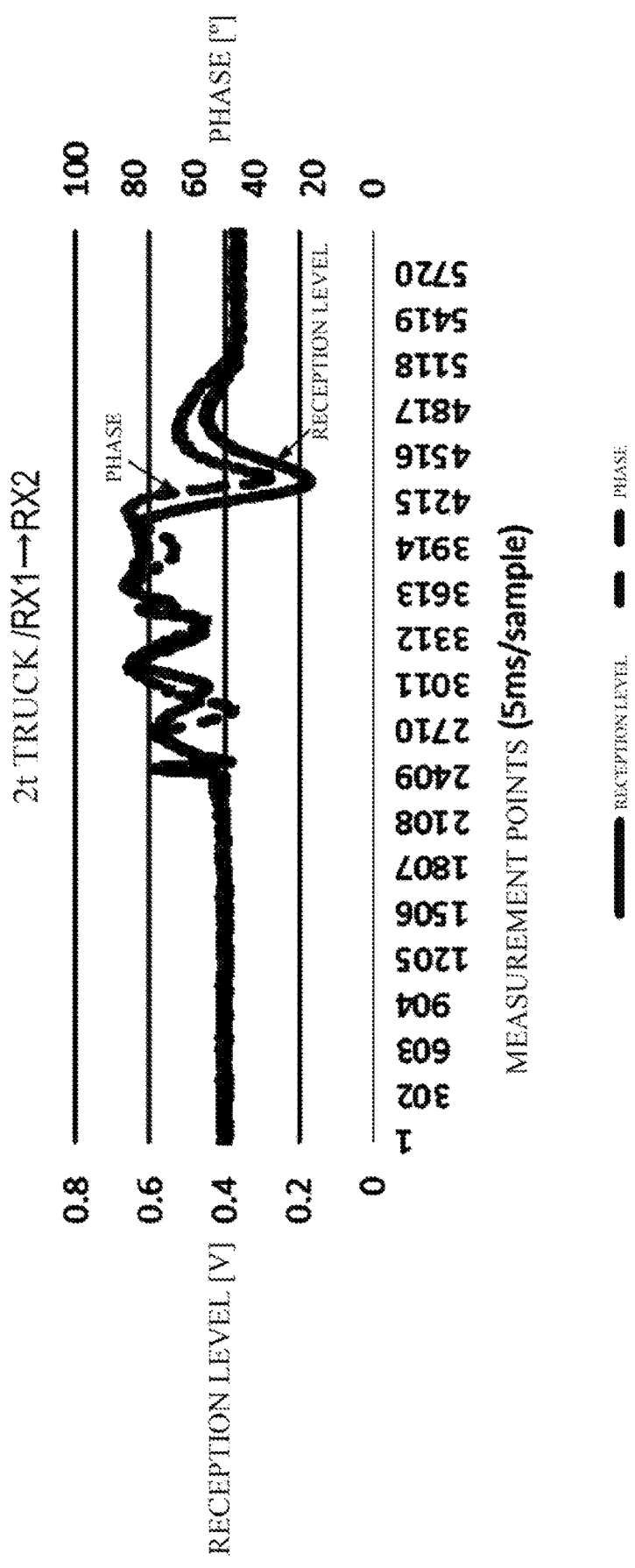
FIG. 9 is a diagram illustrating time-series data obtained by converting time-series X and Y data collected for a 2 t truck vehicle into a reception level and a phase value according to an embodiment.
Figure 10:
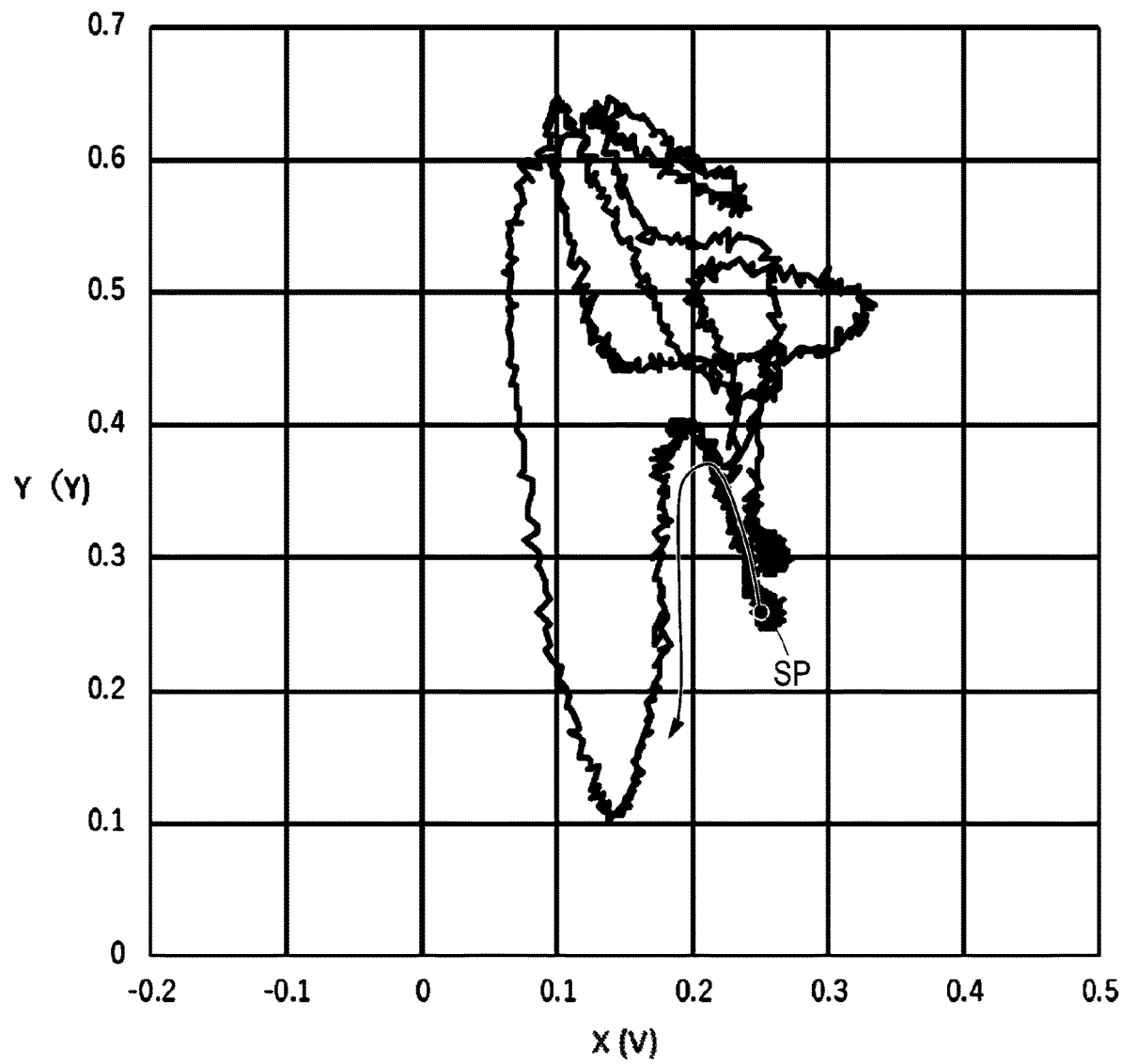
FIG. 10 is a diagram illustrating the X and Y trajectory of a 2 t truck vehicle according to an embodiment.
Figure 11:
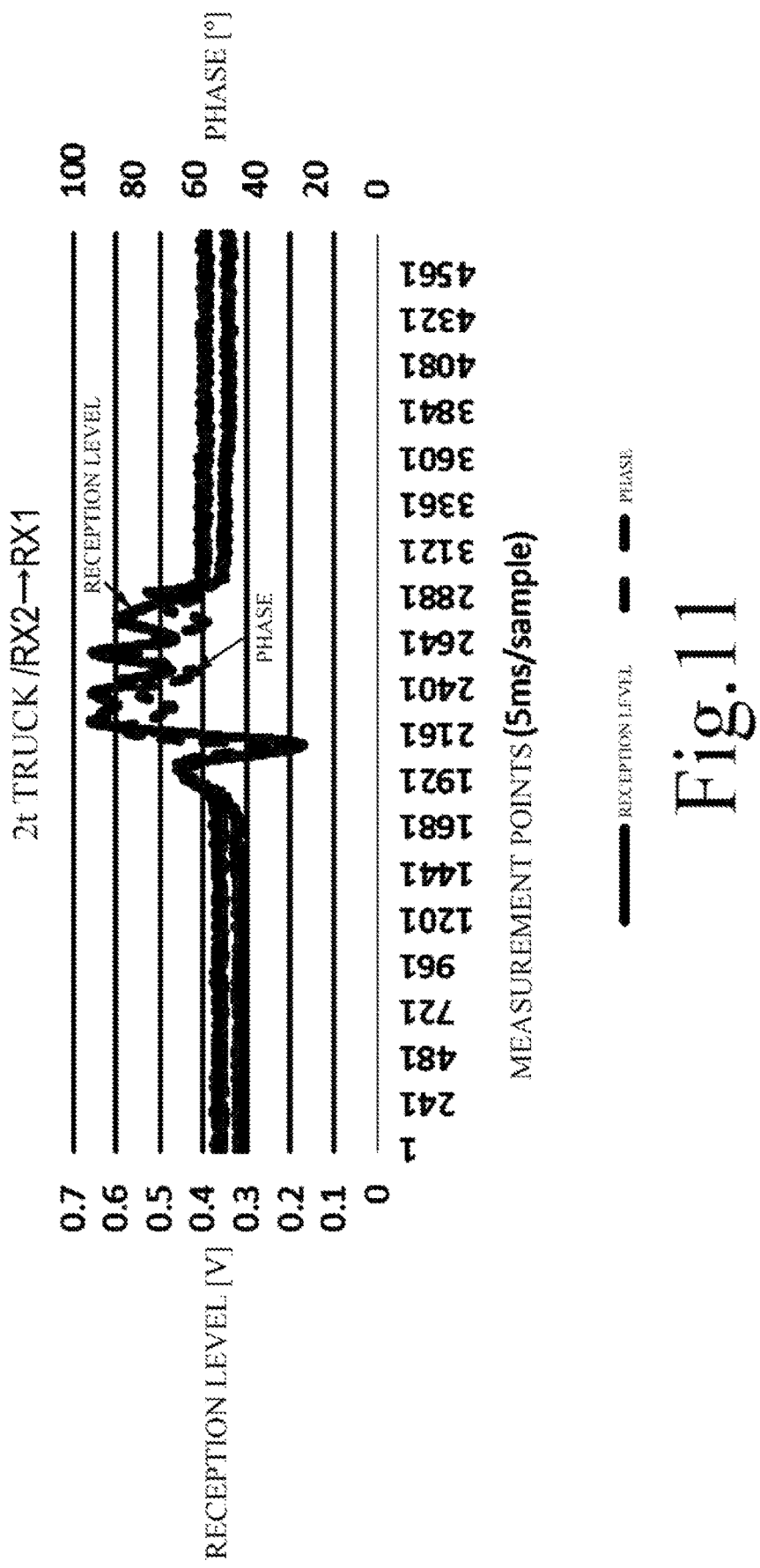
FIG. 11 is a diagram illustrating time-series data obtained by converting time-series X and Y data collected for a 2 t truck vehicle into a reception level and a phase value according to an embodiment.

FIG. 4 to FIG. 7 illustrate data for a one-box car, and FIG. 8 to FIG. 11 illustrate data for a 2 t truck. FIG. 4 and FIG. 6 are X, Y trajectories of a one-box car. FIG. 5 and FIG. 7 are time-series data obtained by converting the collected time-series X, Y data into the reception level and the phase value. FIG. 8 and FIG. 10 are X, Y trajectories of a 2 t truck, and FIG. 9 and FIG. 11 are data obtained by converting the collected Y, Y data into a reception level and a phase value in time series.

In this test, it is possible to confirm the effectiveness of the following specific vehicle extraction method (vehicle type extraction method). More specifically, the shape of the trajectory differs depending on the vehicle 90. According to this characteristic, in this vehicle type extraction method, the vehicle 90 may be identified by comparing the trajectory shapes of the vehicles 90. As a method of comparing the trajectory shapes, template matching generally used in image processing is used to perform shape comparison of a trajectory image (reference image) for each vehicle type registered in advance and the obtained trajectory shape data (in other words, the trajectory image), and the comparison may be done by the matching rate.

The trajectories of the vehicle 90 traveling in the direction from the first reception coil RX1 to the second reception coil RX2, and traveling in the direction from the second reception coil RX2 to the first reception coil RX1 of the one-box car in FIGS. 4 and 6 are used as a reference. In FIG. 4 and FIG. 6, the starting point mark "●" is the trajectory starting point SP at the start of detection.

As illustrated in the figures, as a result of whether the direction is the direction from the first reception coil RX1 to the second reception coil RX2, or the direction from the second reception coil RX2 to the first reception coil RX1, the direction at the start of change from the start of the trajectory differs. In other words, the direction the vehicle is traveling in may be determined by determining the trajectory direction. FIG. 8 and FIG. 10 are examples of a 2 t truck, and the same results are obtained for the 2 t truck.

Figure 12:
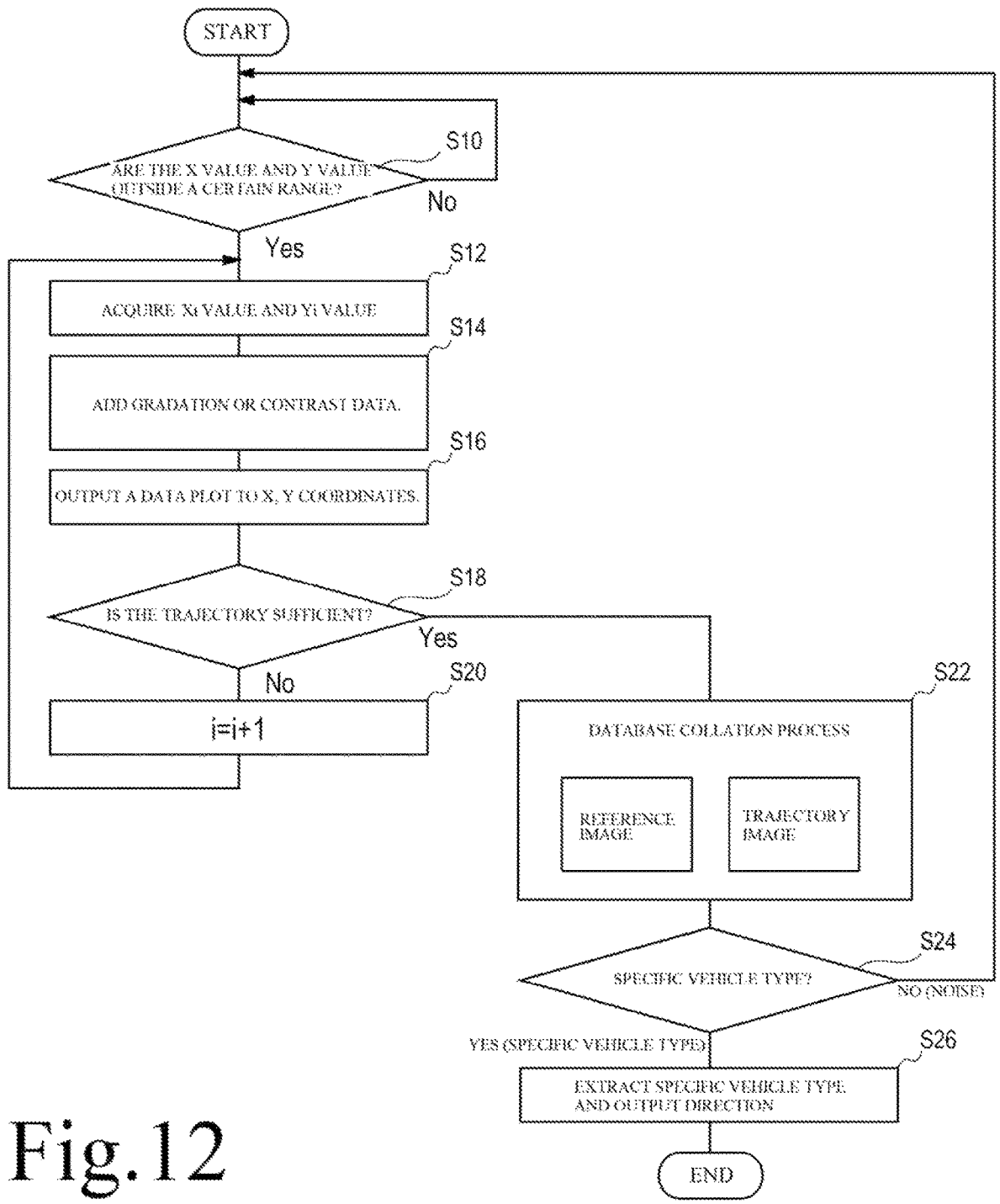
FIG. 12 is a flowchart illustrating an example of a trajectory determination method according to an embodiment.

An example of the trajectory determination method is described below using the flowchart of FIG. 12. When determining the trajectory, the acquired data is converted into an image and the determination is performed by image processing.

In the steady state in which the vehicle 90 is not detected, the value of (X, Y) is within the fixed range of data (NO in S10). In a case where the vehicle 90 passes the sensor, the value of $(X_i, Y_i)$ of the vehicle detection level exceeds a fixed level range (YES in S10). In other words, the system (the apparatus corresponding to the detection system 1 in FIG. 2 or the monitoring system 101 in FIG. 14 described later) acquires trajectory data and performs trajectory determination when the level exceeds the fixed level range (S12 to S26).

The basic idea of trajectory determination is as described below. The data sampling for performing trajectory determination is required to be sufficiently fast with respect to the vehicle speed and to have a sampling resolution capable of determining the trajectory shape. Therefore, high-speed sampling above a certain level is required in the trajectory determination process. At this time, in a case where the vehicle speed is slow or in a case where the sensor is temporarily stopped, the number of data to be acquired for the trajectory determination becomes extremely large. In addition to the problem of the number of data, the trajectory shape is different for each vehicle type, and therefore it is unreasonable in terms of processing load to perform calculation by finding the law of the trajectory using a complicated algorithm. In that respect, by performing image conversion, the difference in the vehicle speed only changes in the density difference of the trajectory plot quantity on the image data, and does not affect the determination processing load. In other words, to temporarily convert acquired data into an image, then use image processing to perform pattern matching with pre-registered reference trajectories of vehicle model types to determine a specific vehicle type is economical and effective with little processing load.

Moreover, in regard to distinguishing the direction, from the start of data acquisition of trajectory data to the end of data acquisition, a gradation or contrast difference is added at the time of data output and outputted. As a result, the trajectory image becomes a trajectory image in which gradation or contrast difference is inserted. This gradation or contrast difference is determined using image processing to determine the direction of the trajectory.

As a specific flow, in trajectory determination, the system acquires $(X_i, Y_i)$ (S12), and from the aspect of distinguishing the direction as described above, adds gradation or contrast data (S14), and outputs a data plot to the X, Y axes (S16). Here, in a case where a sufficient trajectory is not drawn (NO in S18), in other words, incrementation i=i+1 is performed (S20), and the process returns to the acquisition of $(X_i, Y_i)$ (S12).

In a case where a sufficient trajectory is drawn (YES in S18), the system performs a database collation process (S22). In other words, matching of the trajectory image and the reference image is performed to determine whether or not the trajectory is of a specific vehicle type (S24).

In a case where the trajectory is of a specific vehicle type (YES in S24), the system extracts the specific vehicle type, and further outputs the direction (S26). In a case where the trajectory is not of a specific vehicle type (NO in S24), or in other words, in a case where the trajectory is determined to be noise, the process returns to S10.

Figure 13:
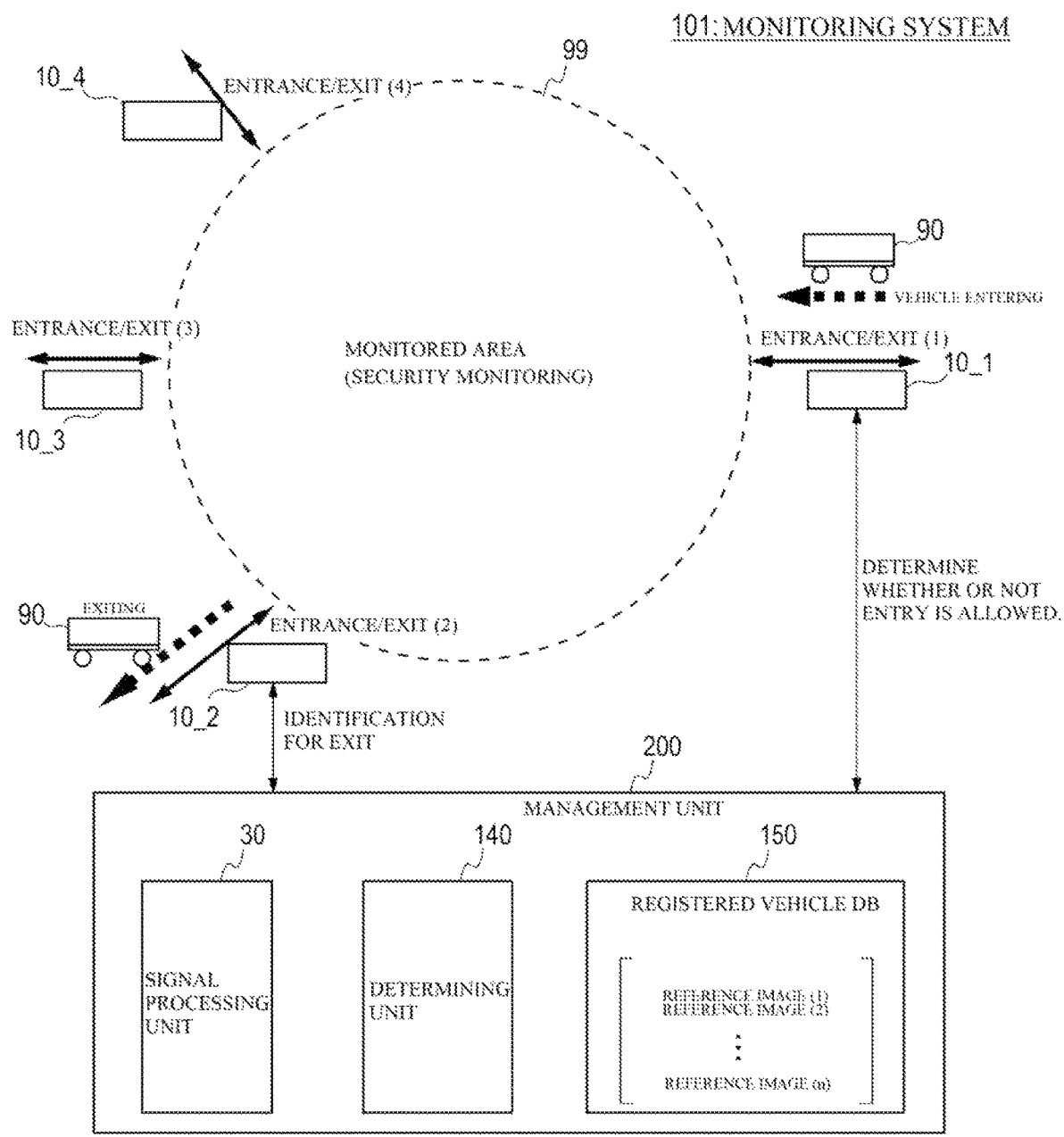
FIG. 13 is a diagram illustrating a monitoring system applied to a monitored area (security monitoring of a construction site or the like) according to an embodiment.
Figure 14:
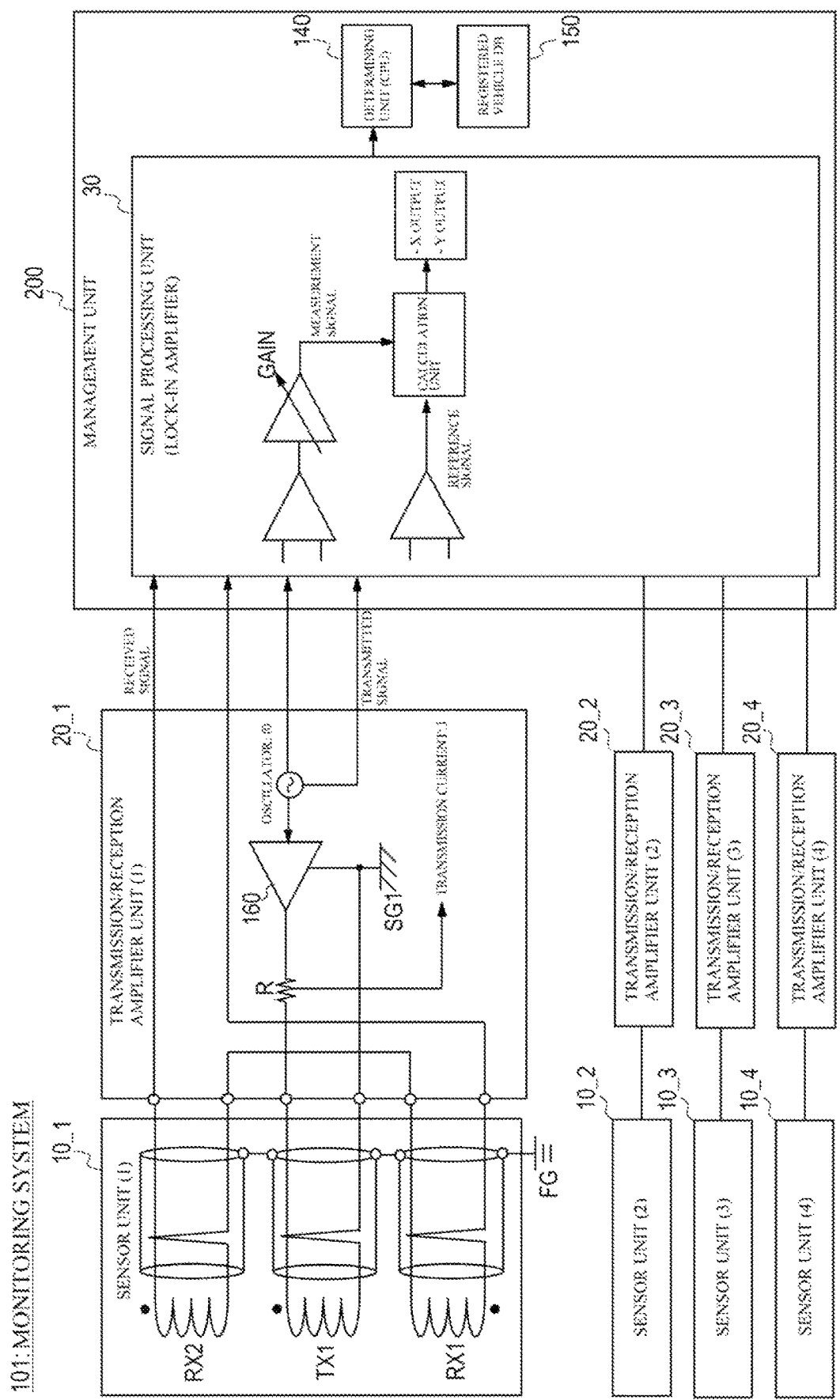
FIG. 14 is a schematic block diagram of a monitoring system according to an embodiment.

FIG. 13 is an outline of a monitoring system 101 in which the above-described technique is applied to a monitored area 99 (security monitoring of a construction site or the like). FIG. 14 is a schematic block diagram of the monitoring system 101.

As illustrated in FIG. 13, a monitored area 99 that is a construction site is provided with a plurality of entrances and exits; four entrances and exits (1) to (4) in this case. Conventionally, in such a work area, the number of persons in charge of work and the number of workers are identified by an ID card or the like, and the vehicle 90 is parked at a work place after receiving a parking permit. When leaving after the work is completed, the worker's ID card is checked again and whether the parking permit for the vehicle 90 has been returned is checked. In this kind of a system, the worker can check the entry time and the exit time with an ID card or the like, so the security level may be maintained at a certain level, however, it is also easy to intentionally leave the vehicle 90 in the monitored area 99. This kind of a situation is not preferable from the aspect of ensuring security.

Therefore, a monitoring system 101 using an electromagnetic induction sensor is built in the monitored area 99. The monitoring system 101 includes four sensor units (1) to (4) 10_1 to 10_4 and four transmission/reception amplifier units (1) to (4) 20_1 to 20_4 installed at the entrances and exits (1) to (4), respectively, and a management unit 200. The sensor units (1) to (4) 10_1 to 10_4 and the transmission/reception amplifier units (1) to (4) 20_1 to 20_4 are apparatuses having the same configuration as the sensor unit 10 and the transmission/reception amplifier unit 20 of FIG. 2.

The management unit 200 includes a signal processing unit 30, a determining unit 140, and a registered vehicle DB (database) 150.

The signal processing unit 30 connects the four transmission/reception amplifier units (1) to (4) 20_1 to 20_4, acquires the transmitted/received signals of the sensor units (1) to (4) 10_1 to 10_4, and for each, outputs the X and Y coordinates of the processing result in the polar coordinate system to the determining unit 140.

In the registered vehicle DB 150, reference images, which are vehicle trajectory data of vehicles allowed to enter the work area, are registered in advance. Although a reference image is not illustrated in the figure, a dedicated entrance for allowing a vehicle 90 entering the first time to enter the monitored area 99 may be provided, vehicle trajectory data and the trajectory direction of the entry direction may be acquired, and vehicle trajectory data for a vehicle allowed entrance may be used as the reference image.

When the vehicle 90 passes over a sensor unit 10 (sensor units (1) to (4) 10_1 to 10_4), the determining unit 140 executes a pattern matching process between the acquired trajectory image and the reference images, and determines whether or not there is a match with a reference image of a registered vehicle.

In a case where there is a match with a reference image, the determining unit 140 determines the trajectory direction, which is either an entry direction or an exit direction. In a case where the result of the trajectory determination is that the trajectory direction is an entry direction, the system sets an entry flag on the reference image of the vehicle registered in the registered vehicle DB 150 that is to be allowed to enter. In a case where the result of the trajectory determination is that the trajectory direction is an exit direction, the determining unit 140 compares the acquired trajectory image with the reference image in the database that has been checked with an entry flag, and removes the entry flag from the data of the vehicle that is exiting. In this way, check-in and check-out of a vehicle may be monitored in arbitrary time units. As a result, it is possible to prevent a vehicle 90 from being left unattended, and security may be ensured.

The features of the present embodiment will be briefly summarized below. In other words, (1) the vehicle type is determined based on the result of the trajectory image measured by an electromagnetic induction sensor. (2) Moreover, the electromagnetic induction sensor (sensor unit 10) uses the transmission coil TX1 for emitting the transmission magnetic field, and the first reception coil RX1 and the second reception coil RX2 that receive the magnetic field emitted from the transmission coil TX1. The first reception coil RX1 and the second reception coil RX2 are sensors characterized by differential connection. (3) By differentially connecting the first reception coil RX1 and the second reception coil RX2, it is possible to cancel inductance changes due to temperature changes and electromagnetic noise in an electromagnetic environment. Therefore, it is possible to stably output the reception level and the phase difference when the vehicle is detected. (4) The reception level and the phase difference of each vehicle 90 are plotted using orthogonal coordinates, and the vehicle type is distinguished based on the change in the shape of the obtained trajectory image. (5) In shape matching of the trajectory image, the vehicle type is distinguished by matching the trajectory image with a reference image registered in advance.

The present invention has been described above based on the embodiments. The embodiments are exemplary, and it should be understood by a person skilled in the art that it is possible to make various modifications to the combinations of each of the components and processing processes, and such modifications are also within the scope of the present invention.

FIG. 13 illustrates an example in which the present invention is applied to a construction site; however, as other application examples, the present invention may also be applied to various systems such as a system installed on general roads to extract buses, a system installed at the entrance of a parking lot to extract only the vehicles of delivery businesses, and the like.

Moreover, an example has been described in which the distance L1 between the transmission coil TX1 and the first reception coil RX1 and the distance L2 between the transmission coil TX1 and the second reception coil RX2 are fixed by a differential connection method; however, the distance between L1 and L2 is not particularly fixed, and even in a case where there is a separation difference between L1 and L2, only the output waveform trajectory is different, and vehicle detection may be similarly performed. Further, although a method of detecting a vehicle bottom portion 92 of a vehicle 90 has been described, the front portion of a vehicle or a side portion of a vehicle may be used. In addition, the vehicle 90 may be made of a metal body such as a railway vehicle, a road traffic vehicle, a motorcycle, or the like. Furthermore, the object to be detected is not limited to the vehicle 90, and the invention may also be applied to vehicles having metal such as ships, aircraft, and the like.

Moreover, an example has been given in which the trajectory is drawn from the trajectory starting point SP at the start of detection and the entire trajectory up to the return to the trajectory starting point SP is plotted and collated; however, distinguishing a vehicle may be performed in only a portion near the trajectory starting point SP. In other words, as long as the registered trajectory has a feature that can be distinguished from other vehicles 90 in a portion near the trajectory starting point SP, by distinguishing a vehicle using only that part, it is possible to suppress the amount of registered data and reduce the distinguishing load (improve distinguishing speed).

It is also possible to extract the characteristics of the obtained data and perform vehicle detection and distinguish vehicle type without performing image processing. For example, after exceeding a certain threshold value, values may be outputted in X, Y coordinates (orthogonal coordinate system) and the MIN value and MAX value of the X output may be extracted, and similarly the MIN value and MAX value for the Y coordinate may be extracted, and the vehicle type may be distinguished based on the variation range value of the X coordinate and the variation range value of the Y coordinate. Moreover, the vehicle type may be distinguished by obtaining a correlation coefficient (particularly, an autocorrelation coefficient) of the obtained data.

REFERENCE SIGNS LIST

1 Detection system
10 Sensor unit
10_1 to 10_4 Sensor units (1) to (4)
20 Transmission/reception amplifier unit
20_1 to 20_4 Transmission/reception amplifier units (1) to (4)
30 Signal processing unit
40 Data logger
90 Vehicle
92 Vehicle bottom portion
99 Monitored area
140 Determining unit
150 Registered vehicle DB
101 Monitoring system
RX1 First reception coil
RX2 Second reception coil
TX1 Transmission coil

The invention claimed is:
1. A detection system comprising:
an electromagnetic induction sensor comprising a transmission coil, a first reception coil combined magnetically with the transmission coil and positioned apart from the transmission coil, and a second reception coil that is differentially connected to the first reception coil; and a vehicle detection unit configured to detect that a vehicle has passed through an area where the electromagnetic induction sensor is installed;

characterized by:

a trajectory image output unit configured to plot detection waveforms in a coordinate system represented by a reception level defined as a differential output of the first reception coil and the second reception coil, and a phase difference of the received differential output and a signal transmitted by the transmission coil, and to output a 2-dimensional trajectory image in a time series; and in that, the first reception coil is positioned apart from the transmission coil along a traveling direction about which a vehicle can travel;

the first reception coil, the transmission coil, and the second reception coil are positioned along a traveling direction of the vehicle in sequence, so that a distance between the transmission coil and the second reception coil is equal to that between the first reception coil and the transmission coil; and the vehicle detection unit is configured to detect that a vehicle has passed through an area where the electromagnetic induction sensor is installed based on the trajectory image.

2. The detection system according to claim 1 further comprising:

a registration unit configured to pre-register a trajectory image of a vehicle to be detected as a reference image; and a determining unit configured to compare the reference image with the trajectory image outputted from the trajectory image output unit to determine whether a vehicle is a registered vehicle.

3. The detection system according to claim 2 wherein the vehicle detection unit is configured to determine a traveling direction.

4. A detection system comprising:

an electromagnetic induction sensor comprising a transmission coil, a first reception coil combined magnetically with the transmission coil and positioned apart from the transmission coil, and a second reception coil that is differentially connected to the first reception coil; and a determining unit configured to plot detection waveforms in a coordinate system represented by a reception level defined as a differential output of the first reception coil and the second reception coil, and a phase difference of the received differential output and a signal transmitted by the transmission coil, and to output a 2-dimensional trajectory image in a time series, and configured to determine a vehicle by extracting characteristics of the output result;

wherein the first reception coil is positioned apart from the transmission coil along a traveling direction about which a vehicle can travel; and the first reception coil, the transmission coil, and the second reception coil are positioned along a traveling direction of the vehicle in sequence, so that a distance between the transmission coil and the second reception coil is equal to that between the first reception coil and the transmission coilthe second reception coil is positioned in a symmetrical position to the first reception coil with regard to the transmission coil.

* * * * *